United States Patent [19]

Rochelle et al.

[11] Patent Number: 4,785,195

[45] Date of Patent: Nov. 15, 1988

[54] POWER LINE COMMUNICATION

[75] Inventors: Robert W. Rochelle; Fred W. Symonds, both of Knoxville; Raymond K. Adams, Oak Ridge, all of Tenn.

[73] Assignee: University of Tennessee Research Corporation, Knoxville, Tenn.

[21] Appl. No.: 56,869

[22] Filed: Jun. 1, 1987

[51] Int. Cl.[4] .......................................... H04M 11/04
[52] U.S. Cl. ...................................... 307/18; 307/40; 307/125; 340/310 R; 340/310 A
[58] Field of Search ............................ 307/140, 34–41, 307/139, 149, 150, 18; 340/310 R, 310 A, 310, 825.06; 379/102, 103, 104, 105, 106, 61, 63

[56] References Cited

U.S. PATENT DOCUMENTS

| | | | |
|---|---|---|---|
| 3,359,551 | 12/1969 | Dennison | 307/125 X |
| 3,911,415 | 10/1975 | Whyte | 340/310 A |
| 3,938,129 | 2/1976 | Smither | 340/310 |
| 3,967,264 | 6/1976 | Whyte et al. | 340/310 A |
| 4,173,754 | 11/1979 | Feiker | 340/310 R |
| 4,210,901 | 7/1980 | Whyte et al. | 340/310 R |
| 4,245,215 | 1/1981 | O'Connor et al. | 340/310 A |
| 4,246,492 | 1/1981 | Vandling | 307/40 |
| 4,347,575 | 8/1982 | Gurr et al. | 307/35 X |
| 4,348,582 | 9/1982 | Budek | 219/483 |
| 4,357,598 | 11/1982 | Melvin, Jr. | 340/310 A |
| 4,370,563 | 1/1983 | Vandling | 307/40 |
| 4,398,178 | 8/1983 | Russ et al. | 340/310 |
| 4,467,314 | 8/1984 | Weike et al. | 307/40 X |
| 4,468,792 | 8/1984 | Baker et al. | 375/45 |
| 4,471,232 | 9/1984 | Peddie et al. | 307/40 X |

Primary Examiner—William M. Shoop, Jr.
Assistant Examiner—Paul Ip
Attorney, Agent, or Firm—Luedeka, Hodges & Neely

[57] ABSTRACT

An improved signaling system for command and information signaling over a power system interconnection comprising the utilization of pseudo-random binary pulse code with frequency modulation to overcome the extraordinarily high noise ambient while providing a way of achieving practicable transmission within the constraints typically inherent in a large interconnected power system.

18 Claims, 4 Drawing Sheets

POWER LINE COMMUNICATION

This invention relates to Power Line Communication and Control, and more particularly to such communication and control especially adapted for utilization within a large interconnected power system. The U.S. Government has rights in this invention pursuant to C.F.R. §100.6.

BACKGROUND OF THE INVENTION

Electrical generating facilities are normally interconnected with other similar facilities. This occurs for many reasons, among which are the necessity for back-up power supply in the event of loss of a unit, the need for shut-down of units to accomplish maintenance, varying loads, and the need for generating power most economically. In order to effect the required coordination between generating units, interconnecting transmission lines and users, it is necessary that there be effective and reliable communication between them. This communication has previously been effected in many ways well known to those skilled in the art. For example, there have been supervisory circuits dedicated to this purpose, e.g., telephone lines or carrier current circuits. However, separate dedicated circuits, especially those with the required degree of redundancy or other form of reliability, involve significant additional expense, and there therefore have been various proposals to provide the desired degree of communications effectiveness through signaling accomplished over the interconnecting transmission lines.

One major obstacle to the use of the transmission lines themselves has been the incredibly high noise level that exists on such lines. The extraordinarily high voltage on such lines induces some corona discharge despite design of system components to minimize it. Additionally, there is a small amount of leakage across supporting or other insulators, all of which tends to produce electrical noise. But of even greater significance are the spikes and other voltage disturbances occasioned by switching and lightning transients.

In order to overcome system noise while achieving the potential economies of using the transmission lines, there have previously been proposed methods of signaling which involve producing slight changes of frequency within an interconnection. Such frequency changes have signaled the desired information by one or a combination of: (1) absolute frequency change; (2) the rate of change of the frequency; or (3) the duration of a particular frequency. Such proposals are embodied in two United States Patents: U.S. Pat. No. 4,246,492 granted to John M. Vandling, on Jan. 20, 1981; and U.S. Pat. No. 4,370,563 granted to John M. Vandling, deceased (Patricia Vandling, executrix) on Jan. 25, 1983. However, the proposals of these patents were dependent upon knowledge of the absolute value of the system frequency. In addition, they required complex controllers to invoke the required frequency, rate-of-change of frequency, and duration. Moreover, since in large interconnected grids, extremely large quantities of power are generally required to effect the changes needed for signaling according to Vandling's proposals, the proposals of his patents have not found practical application. Accordingly, the need has continued for proposals that achieve the desired signaling characteristics while preserving reliability, economy and security.

BRIEF SUMMARY OF THE INVENTION

The present invention overcomes the problems of the prior art proposals by utilizing an improved signaling embodying coded pulse-code modulation of the system frequency. By suitably pulse-code modulating the system frequency, advantage is taken of the fact that the signal (discrete changes in system frequency) adds linearly while the noise (natural changes in system frequency) adds as the square-root of the sum of the squares of the individual components of the noise. The signal-to-noise ratio is therefore a function of the magnitude of the generation applied and removed, the time-length of total application, and the standard deviation of the system frequency. Accordingly, by increasing the time of application of signal (total duration of system frequency changes), the signal-to-noise ratio is increased. However, due to the constraints inherent in matching generation to load in an interconnected power system, it is not possible to directly increase the duration of system frequency. It is possible though to increase and decrease the system frequency in a predetermined cyclical manner that in effect greatly increases the signal-to-noise ratio, thus making it possible to provide the necessary ratio to overcome the extraordinary noise inherent in conventional interconnections. Moreover, by selecting the predetermined pseudo-random coding of the signals, specific messages may be transmitted, and such signals appear to the casual observer as random fluctuations rather than information-containing signals, thus contributing to security of transmitted information.

OBJECTS AND FEATURES

It is one general object of the invention to improve power line communications in interconnected power systems.

It is another object of the invention to overcome the extraordinary levels of noise inherent in such systems.

It is yet another object of the invention to improve security of communications over interconnecting power lines.

These and other objects of the invention will be apparent from the following detailed description, by way of a preferred embodiment as hereinafter described.

DESCRIPTION OF A PREFERRED EMBODIMENT

Figure 1:
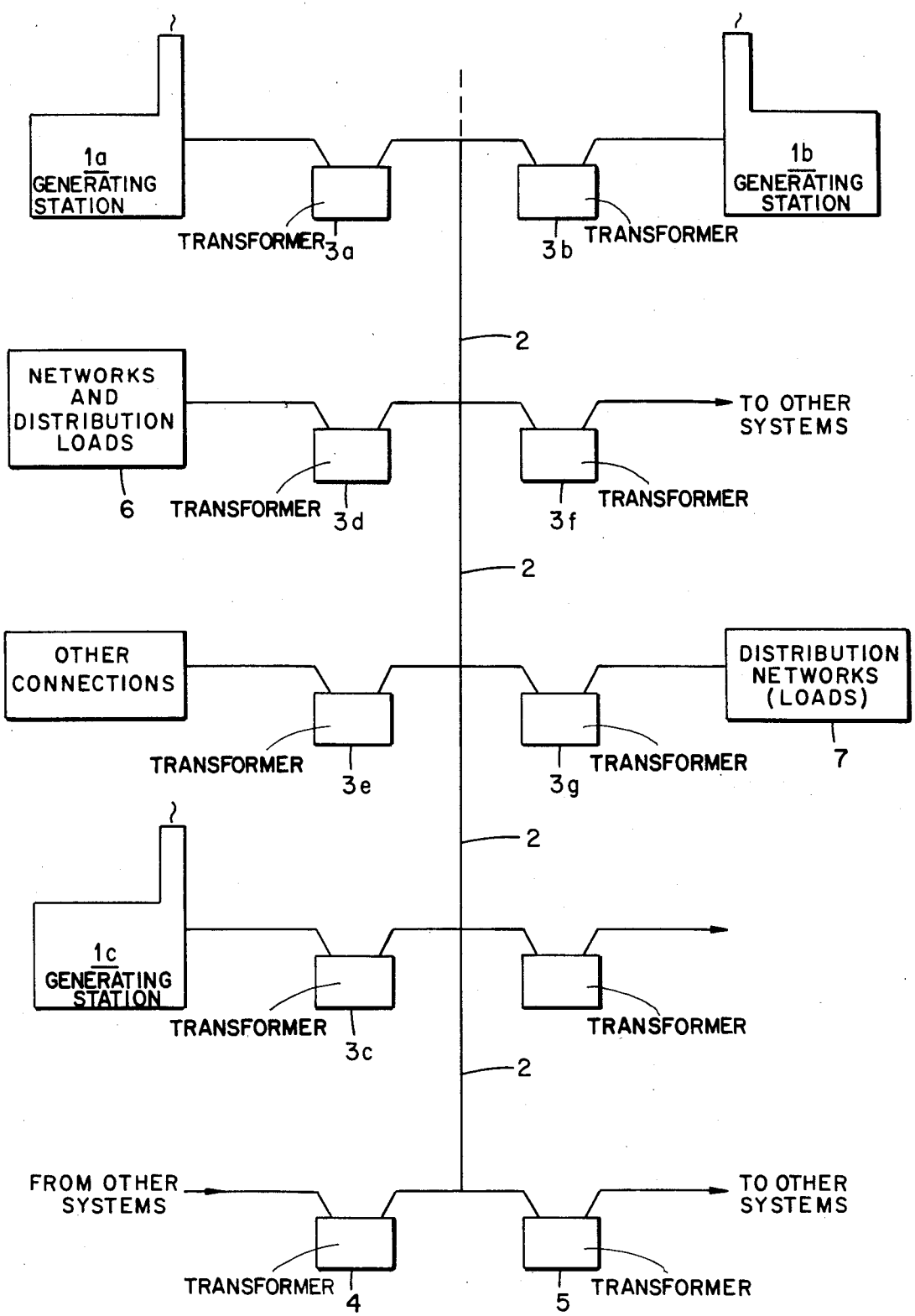
FIG. 1 is a diagram illustrating a part of a typical public utility power interconnection system.

Now turning to the drawings, and more particularly FIG. 1 thereof, it will be seen to depict components of a typical public utility power interconnection system including generating stations 1a, 1b and 1c. These generating stations are connected to transmission line 2 through circuit breakers (now shown) and transformers 3a–3c. Other connections to transmission line 2 are made through transformers 3d–3g.

A typical connection to another system is shown as being made through transformer 3f (as, for example, where the interconnection is over a transmission link of different voltage) and directly through circuit breakers 4 and 5 from and to other systems over transmission links of the same voltage.

Also shown are two typical distribution networks 6 and 7 interconnected by step-down transformers 3d and 3g with users of the generated power.

Although several representative generating stations, interconnections and users are shown, it is to be understood that the major American interconnected systems typically include scores of such generating stations, interconnecting transmission lines and user grids. Since these are connected together with existing wire connections, it is evident that it would be desirable to utilize the existing conductors to conduct signals as necessary or desirable for controlling and coordinating the various parts of the systems.

Figure 2:
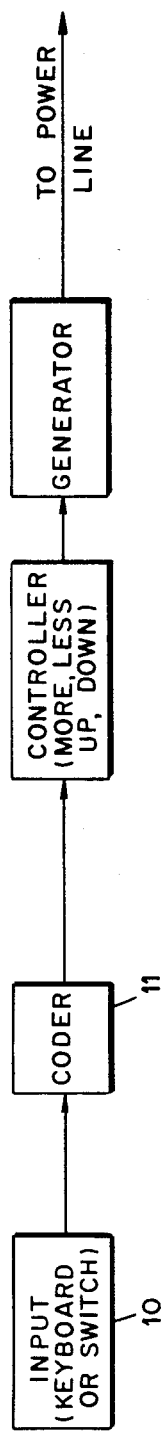
FIG. 2 is a diagram illustrating a preferred form of signal producing and control circuits.

Now turning to FIG. 2, the components of the signal generating system of this invention are shown in block form. However, before proceeding to a description of these components, it will be helpful to an understanding thereof to consider the meaning of the expression "Pseudo-Random Binary Code." As used herein, Pseudo-Random Binary Code means a Binary Code sufficiently non-repetitive in sequential pattern so that in the absence of knowledge of the key to the code, it appears to be random in character.

As is known to those skilled in the art, large conventional interconnected systems such as the United States Eastern Power Interconnection are characterized in that for purposes of control and coordination, all generators are considered to run at the system synchronous speed. Thus, an average of the measured frequency at any point on the interconnection is the same as that measured at any other point. It is also known that a characteristic of the systems is that the common frequency of the interconnected generators will itself vary continuously as the load on the system varies and the output of the generators is adjusted to match the load. Accordingly, the signaling of this invention must be distinguishable from that which results from the normally occurring changes in system frequency as well as from the intentional over or under frequency operation occasioned from time to time to ensure that time-keeping apparatus, e.g., clocks, read the correct time. The aforementioned pseudo-random binary code messages consisting of cyclic over and under frequency operation meet these requirements because such over and under frequency signals occur about the mean value of the system frequency. The pseudo-random binary code signals are distinguishable from normal changes in system frequency as well as from the background noise that in the past has prevented other signaling systems from finding application by virtue of the message signal generation and detection technique that is called self clocked synchronous binary modulation.

As is known to those skilled in the art, each generator is controlled by governing circuits, commonly, referred to as a governor. In a steam-electric station, the govenor controls the quantity of steam introduced to the turbine, whereas in a hydroelectric facility, it controls the rate of water flow. When the steam or water flow is increased, it tends to increase the speed of the generator, thus increasing its power output.

In the typical United States interconnection, one or more master stations produces a control signal every two to five seconds to signal other stations on the system for increase, decrease or maintenance of power generation. Such signal is received, decoded and applied to the governor of one or more of the station generators so that the station responds appropriately. Accordingly, there presently are receiving and control circuits well known in the art that are responsive to control signals to control the power (and thus, frequency) of the generators in modern steam and hydroelectric stations. The invention hereof advantageously makes use of such existing circuits.

Figure 6:
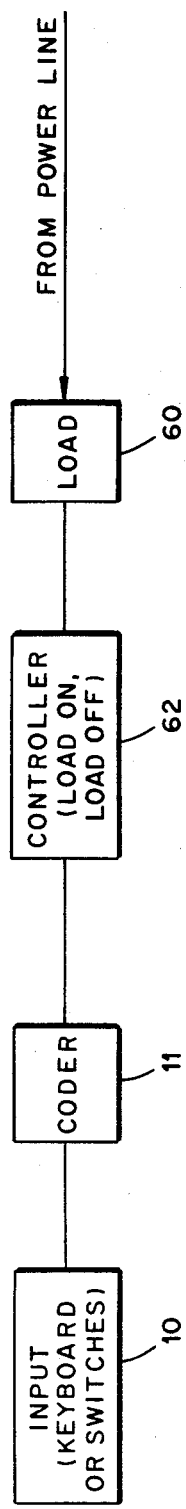
FIG. 6 is a diagram illustrating an alternate embodiment of signal producing and control circuits.

Returning now to FIG. 2, it should be understood that the aforementioned pseudo-random binary encoded frequency modulation can be produced at any generating station supplied with the equipment of FIG. 2 and having the capacity for producing the necessary change in power or, alternatively, the pseudo-random binary encoded frequency modulation can be produced at any single or multiple synchronized locations supplied with the equipment of FIG. 6 which illustrates a load 60 that is selectively connected to the power line by a controller 62. By connecting and disconnecting the load 60, the desired frequency modulation may be accomplished.

Input device 10 is preferably either a conventional keyboard of the type well known in the art, or a multi-position push-button station. This is in turn connected to a coder 11 which produces a multi-bit binary coded output. In the embodiment hereof, the command or message is a four-bit (N) binary sequence. For a pseudo-noise code, (2 to the N)−1 or 15 code sequences can be generated at the output of coder 11, each 15 bits long. Of course, it will be evident to those skilled in the art that additional bits could be used for parity, checking or other purposes if desired.

The output of the coder is then applied to the generator controller which, as mentioned above, is present in modern United States installations. This output is superimposed over the signal received from the master station. Accordingly, during the brief interval when signaling occurs, the signaling raise/lower values are added to the control signals received from the master station.

Figure 4:
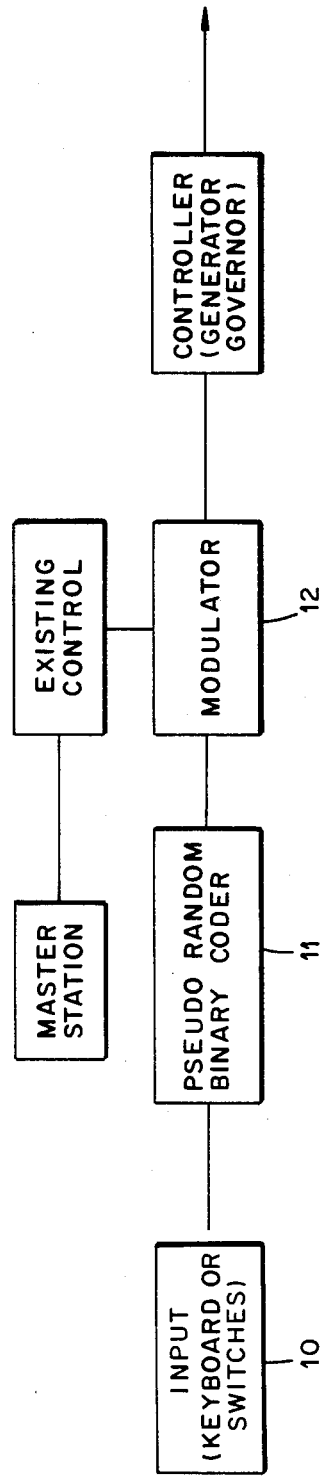
FIG. 4 is a diagram illustrating in greater detail the principal components of the circuits of FIG. 2.

FIG. 4 shows the circuits in greater detail. Here, a modulator 12 is shown as being interposed between the existing control circuits and the generator controller. If the existing control and/or generator governor circuits do not include suitable buffering circuits, such circuits are included within the modulator. As will be recognized by those skilled in the art, such a buffering circuit is a memory register that retains the output of coder 11 until the generator governor has responded.

The modulator 12 produces from its memory buffers a sequence of binary signals that either increase or decrease the speed (and hence power and frequency) of the connected generator during the time interval that the binary signal appears. Typically, the duration of such pulse signal is from two to five seconds.

One form of modulator 12 comprises one or more conventional shift registers that are repetitively sequenced under the control of conventional clock circuits to produce output signals indicative of the memory contents. These are stored in conventional buffers, the outputs of which are then introduced in sequence to the generator controller.

To produce the pseudo-binary characteristic, sequential time delays of predetermined character may preferably be introduced into the sequencing of generator change by changing the shift register clock timing circuit. According to this proposal, such characteristic is fixed by the character of such circuits. In order to prevent unauthorized access to the characteristic of such coding, normal power plant security, well known to those skilled in the art is employed. One such embodiment is to implement the pseudo-binary characteristic as well as the message transmitting modulation algorithm in the generation dispatch computer or an auxiliary special purpose computer that feeds the generator dispatch computer.

Figure 3:
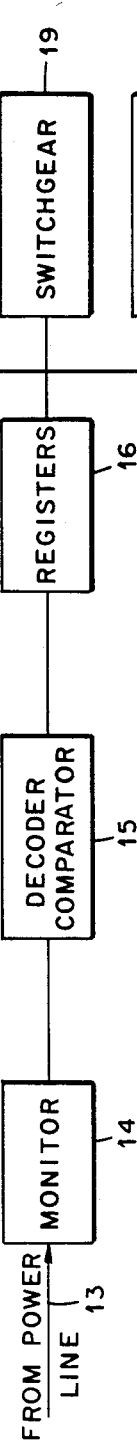
FIG. 3 is a diagram illustrating a preferred form of receiving and utilization circuits.

Now turning to FIG. 3, it will be seen to comprise an input connection 13 introduced into monitor 14. The output of monitor 14 is applied to the input of decoder 15 which decodes the pseudo-random binary encoded signal and applies the output to one or more registers 16 which store the output and which route it to the desired utilization device, e.g., display 17, alarm 18, switchgear 19, or generator controller 20.

Figure 5:
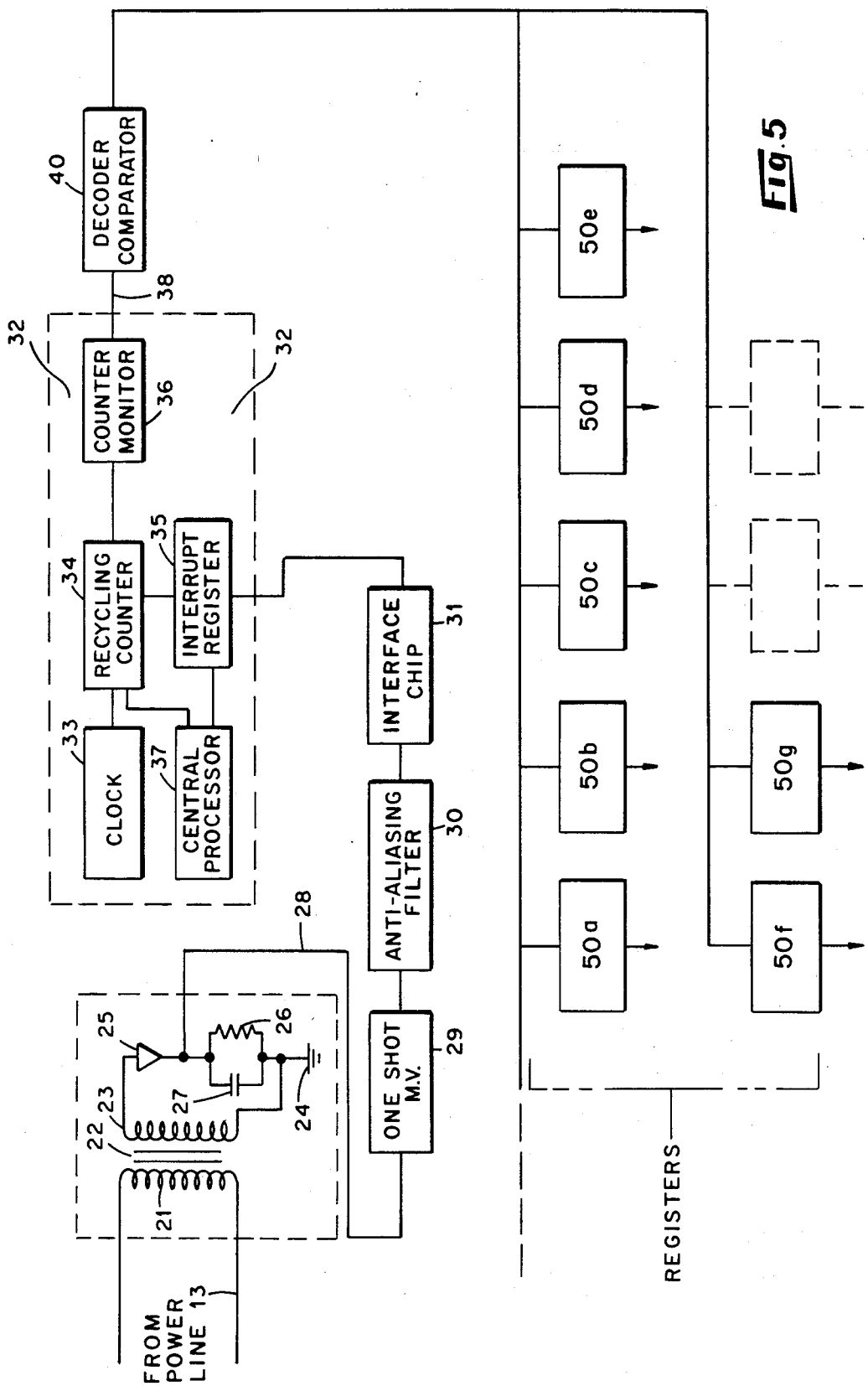
FIG. 5 is a diagram further illustrating the principal components of the receiving and utilization circuits of FIG. 3.

FIG. 5 depicts the circuits of FIG. 3 in greater detail. Here, it will be seen is the connection 13 from the power line which is connected to the primary 21 of transformer 22. The secondary 23 of transformer 22 is serially connected to ground 24 through diode 25 and the parallel combination of resistor 26 and capacitor 27. The rectified output is then conducted over lead 28 to the input of a conventional one-shot multivibrator 29 which is used to eliminate unwanted response to line transients of brief duration. From the multivibrator 29, the signal is passed through anti-aliasing filter 30 which may or not be required, depending upon the conditions existing at the particular facility or installation.

As is well known to those skilled in the art, an antialiasing filter removes frequency components in the signal which would otherwise result in unwanted aliased signals which, under certain circumstances might cause the equipment to respond incorrectly. An example of such filter is a standard low-pass filter having a sharp high frequency cut-off. Typically, a 10-pole Butterworth type filter may be used, although in some applications, a simple two or three pole R-C filter may suffice.

The output from the multivibrator 29 (or antialiasing filter 30 if needed) is then introduced to interface circuits 31 and thence to processing circuits 32. These circuits are well known to those skilled in the art. The interface circuit 31 may be an integrated chip such as that commonly known by the standard industry designation 6522 and manufactured by a variety of integrated circuit manufacturers; and processing circuits 32 may be an integrated chip such as that commonly known by the standard industry designation 6502 and also manufactured by a variety of integrated circuit manufacturers.

As will be observed from reference to the FIGURE chip 32 includes crystal oscillator clock circuits 33, recycling counter 34, interrupt register 35, counter monitor 36 and central processor 37 which is interconnected with clock 33, counter 34 and interrupt register 35 as shown.

In operation, the counter 34 is preloaded under the control of the interrupt register 35, and the clock circuits 33 cause it to count down from its preloaded state until it reaches zero, at which time, it repeats its cycle.

After conditioning by the one-shot multivibrator 29, the signal passes through the anti-aliasing filter 30 (optional) and thence through interface chip 31 to the interrupt register 35. Each time the one-shot multivibrator 29 is activated, an interrupt signal is applied to the processor 37 which then reads the counter to ascertain its condition (how far down it has counted from its preloaded value). The processor then re-enables the interrupt register while reloading the counter with the preload value so that it will repeat the cycle of counting down.

The central processor 37 then responds to the value that had been contained in the counter, summing and averaging the values of multiples of two cycles. This can be extended for a desired length of time, thus improving the effective signal-to-noise ratio as mentioned above. The summed and averaged values of frequency are then spectrally filtered by processor 37 to identify variational components of the frequency that indicate a periodic disturbance or excursion of frequency indicative of one of the message codes. These are then passed to the comparator 40 that may be external to the chip 32 (as shown) or made a part of it. In either event, the comparator circuits (which are well known in the art) compare the sequences of signals applied to it over conductor 38. These comparisons may either be made singly or in multiples; and when the circuits of the comparator identify a sequence identical to its own preconditioned state, it produces a signal which is routed to the appropriate one of registers 50. When one of such registers accumulates the desired number of such registrations, it produces a signal which is then conducted to the desired utilization device, e.g., display 17, alarm 18, or switchgear 19.

It will now be evident that the circuits of this system provide an attractive means of signaling for disconnecting interruptible power loads, for a signal receiving apparatus of the type herein described can be advantageously located at the site of such interruptible load, and the circuit breaker or other disconnecting device controlled in response to an appropriate signal generated, transmitted and received in accordance with the principles hereof.

The principles of this invention may also find attractive application in localities near nuclear power stations. There is a requirement for dependably and promptly notifying nearby residents of any radiation or other danger that may result from operation of a nuclear facility, and the receiving circuits can be miniaturized into a size as small as a two-inch cube and mass produced at small cost, thus making it practicable to locate such a receiver at each home and other facility within a projected danger zone. Also provided and connected to the receiving circuits will be a horn or visual display to call attention to the signaled condition.

It will now be evident that there has been described herein, an improved control and communication system that overcomes the high noise level that heretofore prevented effective use of power systems interconnections for low-cost signal transmission. It should also be evident that the system is simple in design and effects substantial improvement and efficiency in use.

Although the invention hereof has been described by way of example of a preferred embodiment, it will be evident that other adaptations and modifications may be employed without departing from the spirit and scope thereof. For example, just as increasing and decreasing generation will have the effect on the power system of respectively increasing and decreasing system frequency, it is equally true that by increasing and decreasing load, the system frequency will be respectively decreased and increased. Thus, controlling a load, or multiple loads, could be a mechanism for effecting communication throughout the power system, and the principles of the invention are the same whether the incremental frequency changes are by respective increases and decreases as with adding and subtracting generation, or by respective decreases and increases, as with adding or subtracting load. This embodiment is illustrated in FIG. 6 in which a load 60 is shown connected to a load controller 62. In a manner similar to that discussed with regard to FIG. 2, a message is applied through an input 10, such as a keyboard or switches, to a coder 11 that applies a pseudo-random binary code to the controller 62. In response to the code, the controller turns the load on and off to modulate the power line frequency.

As a further adaptation and modification that may be employed without departing from the spirit and scope of the invention, one or more appropriately programmed digital computers could be used to carry out the principles of the invention.

The terms and expressions employed herein have been used as terms of description and not of limitation; and thus, there is no intent of excluding equivalents, but on the contrary it is intended to cover any and all equivalents that may be employed without departing from the spirit and scope of the invention. In particular, references to the singular, such as a generator, should be understood to include the plural. For example, reference to a generator could comprise a bank of synchronized generators, and the singular reference should be understood to be equivalent to the plural.

What is claimed is:

1. Apparatus for use in a power generating system comprising a generating station having at least one generator and load wherein power is generated at a nominal standard frequency and wherein said standard frequency varies with applied generation and load, comprising:
   A. signal generating means for producing binary encoded electrical signals representing information;
   B. means including at least one controller responsive to the application of said binary encoded electrical signals for pulse-code modulating the frequency of the power generating system to produce binary encoded information in the power system frequency corresponding to the binary encoded electrical signals;
   C. interconnecting means interconnecting said at least one generator with said at least one load; and
   D. receiving means connected to said interconnecting means for detecting said pulse-code modulation of the frequency of the power generating system and for decoding said binary encoded information to produce electrical signals representing said information.

2. Apparatus for use in a power generating system comprising a generating station having at least one generator and load wherein power is generated at a nominal standard frequency, wherein said standard frequency varies with applied generation and load, and wherein the output power of said at least one generator is controlled by at least one load controller, said apparatus comprising:
   A. signal generating means for producing an information signal representing at least one item of information, modulation means for producing a coded pulse code modulation signal in response and corresponding to the information signal, means including said at least one controller responsive to the application of said coded pulse code modulation signal for producing corresponding increases and decreases of power generated by said at least one generator thereby to produce frequency modulation of the whole power generating system represented by said increases and decreases of power;
   B. interconnecting means interconnecting said at least one generator with said at least one load; and
   C. receiving means connected to said interconnecting means for detecting said increases and decreases of power and for decoding said frequency modulation represented thereby to produce electrical signals distinctive thereof.

3. Apparatus according to claim 2 wherein said coded pulse code modulation signal includes a pseudo-random code.

4. Apparatus according to claim 2 further including means connected to said receiving means and responsive to said electrical signals produced by said receiving means to correspondingly produce a predetermined physical condition.

5. Apparatus according to claim 4 wherein said information signal is coded to produce a pseudo-random binary encoded signal.

6. Apparatus according to claim 4 wherein said predetermined physical condition is a visual indication.

7. Apparatus according to claim 4 wherein said predetermined physical condition is an audible indication.

8. Apparatus according to claim 4 wherein said predetermined physical condition is the control of an electrical circuit breaker.

9. Apparatus according to claim 4 wherein said load for consuming power is connected to said interconnecting means by at least one circuit breaker and wherein said predetermined physical condition is the opening of said breaker thereby to disconnect said load from said interconnecting means.

10. Apparatus according to claim 2 wherein said receiving means comprises a transient eliminator.

11. Apparatus according to claim 2 wherein said receiving means comprises an anti-aliasing filter.

12. Apparatus according to claim 2 wherein said receiving means comprises a transient eliminator and anti-aliasing filter connected in series.

13. Apparatus according to claim 2 wherein said receiving means comprises a clock, detecting means and central processor.

14. Apparatus according to claim 13 wherein said receiving means further comprises an interrupt register connected to said central processor and to said recycling counter.

15. Apparatus according to claim 2 wherein said receiving means comprises a common digital interface circuit such as a 6522 and a digital central processor control unit such as a 6502.

16. Apparatus according to claim 2 wherein said receiving means further comprises means for comparing predetermined sequential groups of said electrical signals and for producing another signal indicative of the results of the comparison.

17. A method of communicating through a power transmission system wherein power is transmitted at a nominal standard frequency and the frequency is controllably varied from the nominal standard at selected times and the frequency is also varied at other times, the method comprising the steps of:

A. producing a first signal representative of first predetermined condition;
B. producing a coded pulse code modulation signal from the first signal;
C. increasing and decreasing the nominal frequency of said system according to the the coded pulse code modulation signal to frequency modulate the whole power transmission system;
D. detecting the increases and decreases of said nominal frequency to produce a detection signal corresponding to the coded pulse code modulation; and
E. Demodulating the detection signal to reproduce the first signal representative of a first predetermined condition.

18. The method of claim 17 including the step of conditioning said first signal to produce psuedo-random sequences of said signal.

* * * * *